United States Patent Office 3,374,203
Patented Mar. 19, 1968

3,374,203
TRIGLYCIDYL ETHERS AND RESINS OF TRIHYDROXYBIPHENYLS
Seymour Schmukler, Dalton, Mass., assignor to General Electric Company, a corporation of New York
No Drawing. Filed Mar. 25, 1965, Ser. No. 442,813
4 Claims. (Cl. 260—47)

ABSTRACT OF THE DISCLOSURE

Triglycidyl ethers and epoxy resins formed from tetrasubstituted trihydroxybiphenyls.

---

This invention relates to the preparation of new triglycidyl ethers and to novel epoxy resins produced therefrom having high heat distortion temperatures.

The triglycidyl ethers of my invention may be represented by the following general formula:

Formula I

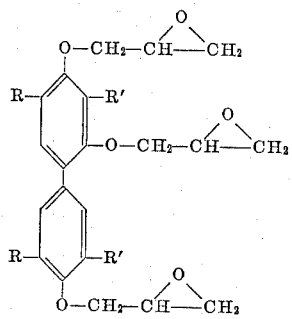

wherein R and R' are monovalent hydrocarbon radicals selected from the group comprising lower alkyl having up to 3 carbon atoms, e.g., methyl, ethyl, propyl, and aryl including alkaryl, e.g., phenyl, and benzyl. R and R' may be the same or different radicals selected from the above group and are intended to have the same meaning throughout the entire specification.

The triglycidyl ethers are prepared from a tetrasubstituted trihydroxybiphenyl having the following general formula:

Formula II

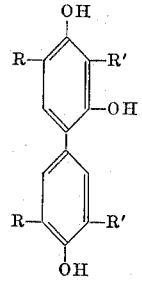

wherein R and R' are as above described. The tetrasubstituted trihydroxybiphenyls are in themselves new compounds and are disclosed and claimed in my copending U.S. patent application Ser. No. 436,958, filed Mar. 31, 1965 and assigned to the same assignee as the present invention. One method for preparing the tetrasubstituted trihydroxybiphenyls includes reacting a 2,6-disubstituted-phenol with oxygen in the presence of a copper chloride-amine complex catalyst to produce a 4,4'-diphenoquinone in a manner disclosed and claimed in copending U.S. patent application Ser. No. 212,128 of Allan S. Hay, filed July 24, 1962, now Patent No. 3,306,875 and assigned to the same assignee as the present invention. This reaction can be represented by the following equation:

Equation I

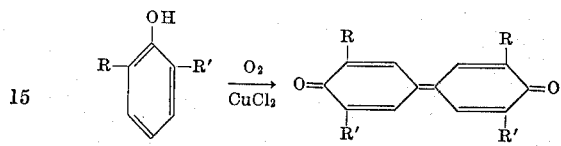

wherein R and R' are the same as in Formula I. Details of this reaction can be found in the above referenced Hay application which is incorporated herein by reference.

The diphenoquinone so produced is then reacted with excess acetic anhydride in the presence of a small amount of sulphuric acid catalyst to give a triacetate in accordance with the following equation:

Equation II

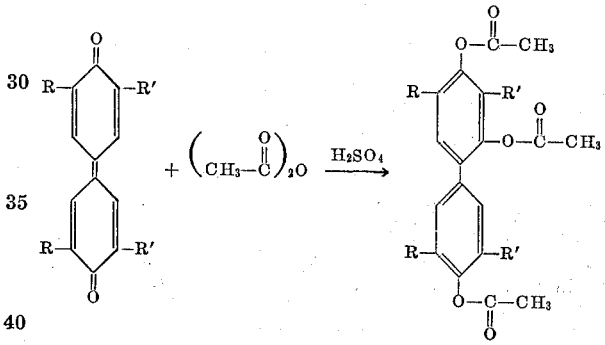

wherein R and R' have the same meaning as noted above. The details of this reaction can be found in my above mentioned copending U.S. patent application Ser. No. 436,958.

The 2,4,4'-trihydroxybiphenyl is then prepared by reacting the product of the above reaction with acidified methanol as shown in the following equation:

Equation III

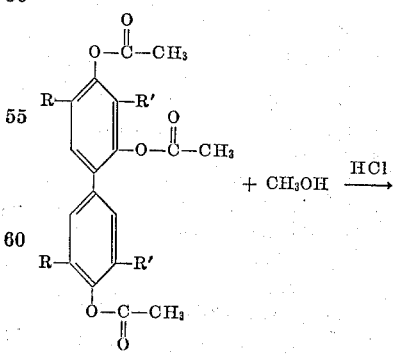

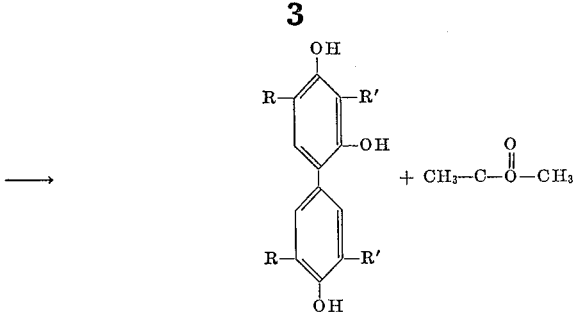

wherein R and R' are the same as in Formula I. Again, the details of this reaction can be found in my copending U.S. patent application Ser. No. 436,958 referenced above.

The triglycidyl ethers of my invention are prepared by reacting the 2,4,4'-trihydroxybiphenyl of Equation III with epichlorohydrin. The reaction theoretically proceeds according to the following equation:

*Equation IV*

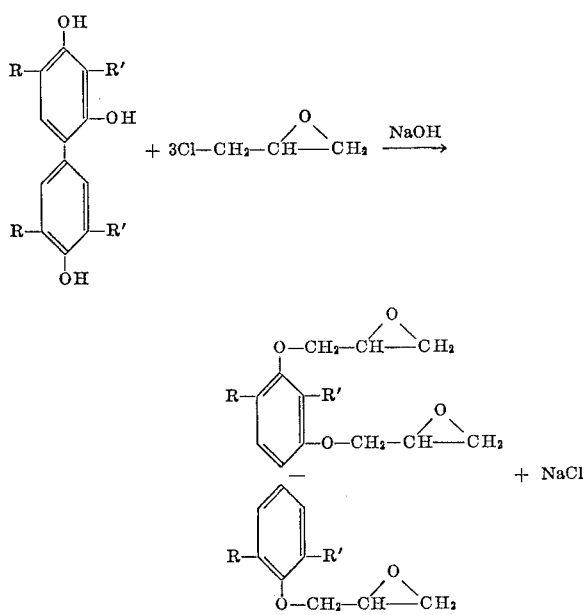

wherein R and R' are the same as in Formula I.

It is difficult to obtain monomeric triglycidyl ether without close control of reaction conditions. The product accordingly may contain some low molecular weight epoxy resin.

The reaction is preferably carried out in the presence of an alkaline material. The preferred alkali is sodium hydroxide. The amount of alkali is approximately 3 moles per mole of trihydroxybiphenyl reacted. Alternatively, the trihydroxybiphenyl can be converted to a sodium salt by adding a material such as sodium methylate, elemental sodium, etc.

To obtain the triglycidyl ether of the trihydroxybiphenyl, three moles of epichlorohydrin are theoretically required for each mole of the diphenyl—i.e., one mole of epichlorohydrin per phenolic hydroxy group. However, when the stoichiometric three-to-one ratio is employed, the yield of the triglycidyl ether is quite low and the remaining material is composed of unreacted diphenyl and mono- and di-glycidyl ethers. In order to obtain a high product yield, excess epichlorohydrin is employed, the amount being as much as 20 times the stoichiometric amount necessary and in a preferred embodiment, between 5–10 times the amount necessary. The use of excess epichlorohydrin offers the additional advantage of serving as a reaction medium, making it unnecessary to employ an additional solvent. The reaction is preferably conducted in an inert atmosphere such as nitrogen to prevent oxidation of the starting phenol.

Theoretically, it is possible to carry out the reaction at room temperature though, elevated temperatures over a period of about 10 hours are preferred for complete reaction. I find that a preferred temperature for this reaction is within the range of 50–100° C. with the most preferred temperature ranging between 60–70° C.

As indicated above, some polymerization of the triglycidyl ether occurs spontaneously during the reaction. By regulating the concentrations of both alkaline material and the epichlorohydrin, the degree of polymerization can be controlled. High alkaline content, i.e., 4 moles per mole of triphenol and stoichiometric quantities of epichlorohydrin promote polymerization and results in poorer yields.

After the reaction has proceeded to completion, the triglycidyl ether is collected by filtering solid sodium chloride formed during the reaction from the reaction mixture. The filtrate is then washed with water to remove inorganic materials remaining in the reaction mixture. The organic layer is concentrated by heating to remove unreacted epichlorohydrin as well as other undesirable volatile materials. Methanol is added to form a solution and hexane is added to the solution to crystallize the triglycidyl ether. The triglycidyl ether can be collected by filtering. Thereafter, if a purer product is desired, the triglycidyl ether can be redissolved in methanol and recrystallized with hexane.

The triglycidyl ethers of this invention are readily cured from the soft, thermoplastic state to a tough, hard thermoset solid. The particular manner of curing the triglycidyl ethers does not constitute a part of this invention. There are three well known curing reactions for epoxy resins, all of which are suitable for curing the triglycidyl ethers of this invention. The first is a direct linkage between epoxy groups. It is believed that the epoxy group is readily opened by action of tertiary amines, active hydrogen, etc. The opening of the epoxy group causes it to ionize. The ion then effects an opening of a second epoxy group which in turn opens a third and this continues until a highly cured material is obtained.

Typical tertiary amines which may be used to open the epoxy groups include trimethylamine, triethylamine, benzyldimethylamine, alpha-methylbenzyldimethylamine, dimethylaminomethylphenol, tridimethylaminomethyl phenol, etc.

A second method for polymerizing the epoxy resins is through linkage of epoxy groups with aromatic or aliphatic hydroxyls. These hydroxyl groups may be introduced into the resin through the addition of curing agents or modifiers or they may be present in the resin chain as when the epoxy group is opened by an active hydrogen during cure or may be present due to the presence of various phenolic hydroxyls as a result of unreacted diphenyls. Normally, the polymerization through hydroxyl groups does not proceed readily and it is necessary to employ a catalyst such as an acid or a base. The principal agents useful for promoting epoxy-hydroxyl reaction are the inorganic bases such as sodium hydroxide and tertiary amines.

A third method of polymerizing the triglycidyl ethers is through the employment of a curing agent to promote crosslinkage through various radicals. Curing is accomplished by mixing the curing agent with the triglycidyl ether and subjecting the mixture to elevated temperatures for prolonged periods of time. The principal crosslinking agents known in the art are poly-functional primary and secondary amines and dibasic acids and acid anhydrides. However, polyfunctional phenols such as bis-phenol A, and resorcinol have also been suggested as crosslinking agents and are sometimes used in conjunction with other curing agents.

It is difficult to generalize as to the amount of curing agent necessary to cure the triglycidyl ethers of this invention. It would appear that 1 equivalent of curing agent should be used for each epoxy group. In practice, it has been found that 0.5 to 1.2 equivalents of curing agent should be used for each epoxy group.

Details for the cure of epoxy resins can be found in the above-referenced book of Lee and Neville.

I have found that the cured epoxy resins of my invention have heat distortion temperatures in excess of many other commercially available epoxy resins similarly cured. For example, after curing for 6 hours at 150° C., the resin had a heat distortion temperature in excess of 160° C. In comparison, a very well known epoxy resin derived from bisphenol A known as Dow 332 subjected to the same cure with the same curing agents displayed a heat distortion temperature of only 121° C.

The following examples are illustrative of the manner in which the triglycidyl ether of my invention may be prepared as well as certain specific properties of the cured epoxy resin prepared therefrom.

EXAMPLE 1

In this example, 12.9 g. (0.05 mole) of 3,3′,5,5′-tetramethyl-2,4,4′-trihydroxybiphenyl were dissolved in 200 ml. of benzene. The solution was purged with nitrogen and 8.1 g. (0.15 mole) of sodium methylate were added to form a phenylate salt of the trihydroxybiphenyl. Nitrogen was thereafter continuously passed through the system and the solution was stirred for one hour. The benzene and methanol formed were distilled off with the aid of a water aspirator. Thereafter, 208 g. (2.25 moles) of epichlorohydrin were added to the solution. The solution was heated to 68° C. and maintained at that temperature for a period of 11 hours. At the conclusion of the 11 hour period, 300 ml. of benzene were added to reduce the viscosity of the mixture. Sodium chloride was filtered from the solution. The filtrate was washed with three 200 ml. portions of water. The filtrate was then concentrated to a viscous amber syrupy liquid. This liquid was diluted by adding 5 ml. of methanol and gently heating on a steam bath. Thereafter, 5 ml. of hexane were added which formed a second layer. The viscous amber liquid slowly solidified and an additional 25 ml. of hexane were added. The mushy solid was filtered to give a somewhat sticky yellow precipitate. This was washed with cold methanol and air-dried to give 5.90 g. of white solid with a melting range between 89–94° C. The solid was dried in a vacuum dessicator maintained at 42° C. overnight to give 5.85 g. of solid.

The epoxide equivalent, which is the weight of resin in grams which contains 1 gram equivalent of epoxy, was determined by reacting a known quantity of resin with a known quantity of hydrochloric acid and back titrating the remaining acid to determine its consumption. This method is set forth in more detail in the above referenced book of Lee & Neville. The epoxide equivalent of the product of this example was found to be 150.2. This indicates that there is only a slight degree of polymerization as the epoxide equivalent of the triglycidyl ether of 3,3′,5,5′-tetramethyl-2,4,4′-trihydroxybiphenyl is 142.

Two and one half grams of the material produced above were mixed with 1.33 g. of methyl nadic anhydride curing agent and 0.05 g. of DMP-30 curing agent. This mixture was placed in an oven maintained at 150° C. for a period of 4 hours. The material so cured did not soften when placed in an oven at 250° C. This indicates that a high degree of crosslinking was obtained and a hard, tough polymer was produced.

EXAMPLE 2

In this example, 12.1 g. (0.047 mole) of 3,3′,5,5′-tetramethyl-2,4,4′-trihydroxybiphenyl were mixed with 208 g. (2.25 moles) of epichlorohydrin to form a solution. The solution was blanketed with nitrogen and 8.1 g. (0.203 mole) of sodium hydroxide were added in 20 ml. of water. The caustic was added over a period of 1½ hours and the temperature of the solution was maintained at 68° C. Upon completion of the addition of the sodium hydroxide, the mixture was maintained at 68° C. for an additional 15 hours. Following this, the temperature of the mixture was raised to distill off unreacted epichlorohydrin and water. Benzene was added (200 ml.) to dissolve the solid in the reaction vessel. The mixture was stirred and filtered under suction. The benzene was then removed from the filtrate with the aid of a water aspirator vacuum. The product resulting from this reaction weighed 23 g.

In order to purify this product, it was dissolved in benzene and washed with three 100 ml. portions of water. After each washing, the mixture was allowed to separate into two layers and the water layer separated in a separatory funnel. Upon completion of the third washing, the organic layer was concentrated to dryness. To purify the product, the solid was heated gently with 5 ml. of methanol and 8 ml. of hexane were added. The mixture was seeded with a few grains of the product of Example 1. On standing, some solid formed. It was filtered and washed with methanol to yield a somewhat sticky solid weighing 1.44 g. This material had an epoxy equivalent of 216, indicating that the triglycidyl ether had spontaneously undergone some polymerization.

EXAMPLE 3

In this example, 129 g. (0.5 mole) of 3,3′,5,5′-tetramethyl-2,4,4′-trihydroxybiphenyl were added to 1 liter of benzene. The solution was blanketed with nitrogen and 81 g. (1.5 moles) of sodium methylate were added. Thereafter, 2,775 g. (30 moles) of epichlorohydrin was added and the reaction mixture was heated to approximately 68° C. and maintained at that temperature for an 11 hour period under a nitrogen blanket. The unreacted epichlorohydrin was distilled off and 2500 ml. of benzene added to the residue. The mixture was filtered to remove any undissolved solids and washed with three 200 ml. portions of water. In each case, the water and the organic solution formed two separate layers and the water layer was removed. Subsequent to the final washing, and after removal of the water layer, the remaining organic layer was concentrated to one-half its volume. The remaining organic layer was filtered and then concentrated to remove any remaining benzene and epichlorohydrin. The product which resulted from this consisted of 199 g. of a red viscous syrup.

One hundred and seventy one grams of this red viscous syrup were heated gently with 40 ml. of methanol and then 65 ml. of hexane were added. The mixture was refrigerated for several hours. It was thereafter filtered and the precipitate washed with 25 ml. of cold methanol and squeezed with a rubber dam. The solid was broken into lumps and washed with 75 ml. of methanol, filtered and again squeezed with a rubber dam to give 59 g. of solid which, on drying at 77° C. in a vacuum dessicator, gave 58.5 g. of tan material with an epoxy equivalent of 171.

EXAMPLE 4

In this example, the epoxy of Example 3 was compared with other well known epoxy resins. Each resin tested was cured using the same procedure. Curing was accomplished by mixing one gram molecular weight of methyl nadic anhydride, 2 parts per hundred of resin (phr.) of DMP-30 (a commercial curing agent available from Rohm and Haas Chemical Company) and one epoxy equivalent of resin. The resin was then molded in the form of a bar and maintained at a temperature of 150° C. for 6 hours.

Heat distortion temperature was determined for each of the cured resins by a procedure similar to that set forth in ASTM 7D648–56. In the test used, a standard bar 2½″ x ½″ x ¼″ of cured resin, suspended at each end, is loaded in the middle with a weight designed to give a uniform fiber stress of 264 p.s.i. The sample is then immersed in a hot oil bath with a temperature control and a deflection measuring dial indicator. The dial indicator is set at 0 and the bath warmed at a rate of 2° C. per minute. When the deflection of the bar reaches 0.005 inch the temperature is designated as the heat distortion temperature. The following results were obtained:

*Table I.—Heat distortion temperatures of cured epoxy resins*

| Resin: | Heat distortion temp., °C. |
|---|---|
| Resin of Example 3 | 161 |
| Dow 332 [1] | 121 |
| Koppers 170 [2] | 155 |
| Koppers 171 [3] | 150 |
| Koppers 955A [4] | 145 |
| Koppers 737A [5] | 150 |
| Koppers 997A [6] | 115 |

[1] Dow 332 is an epoxy derived from bisphenol A with an epoxide equivalent of 174.
[2] Koppers 170 is an epoxy derived from polyhydroxypolyphenyl and has an epoxide equivalent of 147.
[3] Koppers 171 is an epoxy derived principally from a trihydroxybiphenyl and has an epoxide equivalent of 144.
[4] Koppers 955A is an epoxy resin derived from o-cresol novolac and has an epoxide equivalent of 310.
[5] Koppers 737A is an epoxy resin derived from o-cresol novolac with an epoxide equivalent of 225.
[6] Koppers 997A is an epoxy resin derived from o-cresol novolac with an epoxide equivalent of 235.

EXAMPLE 5

In this example, one epoxy equivalent of various common epoxy resins was cured with 1 gram equivalent of meta phenylene diamine for 6 hours at 85° C. and thereafter, for 6 hours at 160° C. Thus, each resin was cured for a total period of 12 hours. After cure, heat distortion temperatures were determined for each of the cured resins by the modified ASTM procedure set forth in Example 4.

The results obtained for each of the cured epoxy resins tested are given below in Table II.

*Table II.—Heat distortion temperatures of cured epoxy resins*

| Resin: | Heat distortion temp., °C. |
|---|---|
| Resin of Example 3 | 200 |
| Dow 332 | 177 |
| Koppers 170 | 207 |
| Koppers 171 | 171 |

EXAMPLE 6

In this example, the epoxy of Example 3 was again compared to other commercial available epoxy resins and heat distortion temperatures were again measured in accordance with the procedure set forth in Example 4.

Curing was accomplished by mixing 1 gram molecular weight of methyl nadic anhydride, 2 phr. of DMP–30 and one epoxy equivalent of the particular resin to be tested. The mixture was cured by exposing it to a temperature of 120° C. for one hour, 150° C. for one hour, 180° C. for one hour, 215° C. for twelve hours, and 240° C. for twenty-four hours. Thus, a total curing time of thirty-nine hours was employed. The following results were obtained:

*Table III.—Heat distortion temperatures of cured epoxy resins*

| Resin: | Heat distortion temp., °C. |
|---|---|
| Resin of Example 3 | >250 |
| Dow 332 | 246 |
| Koppers 170 | >250 |
| Koppers 171 | >250 |
| Koppers 955A | >250 |
| Koppers 159 [7] | 216 |
| Koppers 737A | >250 |
| Koppers 997A | >250 |

[7] Koppers 159 is an epoxy derived from resorcinol with an epoxide equivalent of 130.

It should, of course, be apparent to those skilled in the art that changes may be made in the particular embodiments of the invention described which are within the full intent and scope of the invention as defined by the appended claims.

What I claim as new and desire to secure by Letters Patent of the United States is:

1. A triglycidyl ether having the general formula:

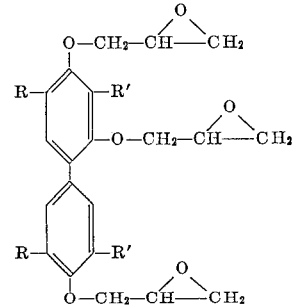

wherein R and R' are monovalent hydrocarbon radicals.

2. The triglycidyl ether of claim 1 wherein R and R' are methyl groups.

3. A cured epoxy resin consisting of a polymerized triglycidyl ether having the general formula:

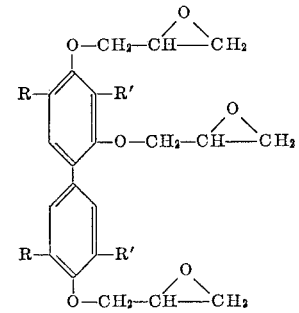

wherein R and R' are monovalent hydrocarbon radicals.

4. The cured epoxy resin of claim 3 wherein R and R' are both methyl groups.

No references cited.

WILLIAM H. SHORT, *Primary Examiner.*

T. D. KERWIN, *Assistant Examiner.*